United States Patent
Zittel

[11] Patent Number: 5,146,841
[45] Date of Patent: Sep. 15, 1992

[54] OPEN-THROAT BLANCHER

[76] Inventor: David R. Zittel, 155 Oak Grove Dr., Columbus, Wis. 53925

[21] Appl. No.: 850,042

[22] Filed: Mar. 12, 1992

[51] Int. Cl.⁵ .................. A23L 3/00; A23N 12/00; A47J 37/12
[52] U.S. Cl. .................. 99/348; 99/404; 99/409; 99/516; 99/536; 100/117; 100/145; 134/65; 134/132; 366/318; 366/234
[58] Field of Search .............. 99/348, 403, 404, 409, 99/450, 483, 487, 516, 534, 536, 477-479, 443 C; 366/81, 101, 102, 234, 318, 319; 134/65, 132; 62/381; 100/117, 145

[56] References Cited

U.S. PATENT DOCUMENTS

| | | |
|---|---|---|
| 241,296 | 5/1881 | Burns . |
| 1,231,002 | 6/1917 | Steere ................ 134/132 |
| 1,290,396 | 1/1919 | Steere ................ 134/132 |
| 1,726,816 | 9/1929 | Forrest . |
| 1,779,046 | 10/1930 | McNaney ............ 134/132 |
| 1,806,957 | 5/1931 | Stocking ............ 134/132 |
| 1,867,541 | 7/1932 | Shellabarger . |
| 2,314,871 | 3/1943 | DeBack ................ 134/65 |
| 2,571,555 | 10/1951 | Fernandes ............ 99/237 |
| 2,909,872 | 10/1959 | Kearney et al. ...... 134/132 |
| 3,135,668 | 6/1964 | Wesson ................ 134/132 |
| 3,484,360 | 12/1969 | Sandrock ............ 366/234 |
| 3,760,714 | 9/1973 | Lortz .................. 99/404 |
| 4,291,619 | 9/1981 | Hunt et al. .......... 100/117 |
| 4,410,553 | 10/1983 | McGinty ............. 99/348 |
| 4,688,476 | 8/1987 | Zittel ................ 99/403 |
| 4,875,344 | 10/1989 | Zittel ................ 62/381 |

FOREIGN PATENT DOCUMENTS

| | | | |
|---|---|---|---|
| 152431 | 6/1904 | Fed. Rep. of Germany | 99/536 |
| 489668 | 1/1930 | Fed. Rep. of Germany | 134/132 |
| 2161446 | 3/1973 | Fed. Rep. of Germany | 134/65 |
| 1144683 | 5/1985 | U.S.S.R. | 99/516 |

Primary Examiner—Timothy F. Simone
Attorney, Agent, or Firm—Lathrop & Clark

[57] ABSTRACT

A stainless steel tank has a hinged cover which closes over a cylindrical drum which is rotatably mounted within the tank. The drum has a stiff support structure with an inlet end plate and a discharge end plate and a plurality of linear support members extending between and rigidly fastened to the two end plates. A helical auger is welded to and supported by the support members and is positioned within the drum by a central core tube. The auger and core tube are not connected to the inlet end plate leaving an unobstructed open-throat which allows the free flow of food product into the drum. A perforated cylinder of screen material surrounds the drum and retains food product therein. An infeed flight attachment extends from the auger to the inlet end plate and has a curved portion which extends beneath the water level to avoid contact with the food product above the water level. The inlet opening to the drum may be of larger diameter than the core tube allowing the introduction of very wide food product into the drum.

9 Claims, 4 Drawing Sheets

5,146,841

OPEN-THROAT BLANCHER

FIELD OF THE INVENTION

The present invention relates to industrial food processing equipment in general and to blanchers in particular.

BACKGROUND OF THE INVENTION

Steam blanchers have long been used in the food processing industry to blanch or cook a continuous throughput of food product such as pasta, green peas, corn, beans and other processed food and vegetables. Uniformity and product integrity are paramount concerns in preparing food for human consumption. To advance the food product through the blancher in a gentle, non-destructive, manner, helical augers mounted within the water filled blancher tank have long been used. The auger is mounted within a cylindrical drum having a perforated steel screen skin which allows water to flow freely into the interior of the drum. Rotation of the drum gently advances food product from the tank inlet to the tank discharge end.

At one time, these augers were mounted on a central drive shaft and were driven directly by an engaged sprocket and motor. A central drive shaft, however, presented several problems. First, the extension of the drive shaft axially through the inlet end of the tank interfered with the introduction of food product into the cylindrical drum. Furthermore, food product coming into contact with the central shaft was subject to damage. In addition, experience showed that central drive shafts were prone to breakage.

Conventional blanchers have eliminated the breakage problem of the central drive shaft by mounting the helical auger flights on a central cylindrical core which extends through the inlet and outlet ends of the blancher tank to define cylindrical journals which are supported on two rotatable trunnions at each end. The cylindrical core is of sufficient diameter to allow the introduction of an infeed chute through the inlet journal. To allow the food product to pass into and exit from the cylindrical drum, the core is replaced at the inlet and outlet ends of the drum with a number of structural steel bars symmetrically spaced a distance from the rotational axis of the drum equal to the radius of the core. These bars provide admirable structural stiffness and do not interfere with the introduction of the infeed chute. Yet the bars, which rotate with the drum with respect to the infeed chute, continuously pass through the path of the infed food product. A certain significant proportion of food product comes in contact with these rotating bars and, if the food product is at all delicate, damage results.

What is needed is a blancher with a rotating auger which permits substantially unobstructed admission of food product into the drum and a resultant preservation of product integrity.

SUMMARY OF THE INVENTION

The blancher of this invention has an open-throat region which is clear of obstructions which would tend to damage food product flowing into the blancher. The blancher has a tank with a hinged cover. The tank and cover define inlet and discharge openings into a rotatable cylindrical drum which is supported by trunnions and rotates within the tank. A stiff load supporting structure for the drum is provided by an inlet end plate connected to a discharge end plate by six C-shaped channel members. A helical auger is located within the drum and is welded to and supported by the channel members. A central cylindrical tube is welded to the auger along the axis of the drum. The beginning of the auger and the tube is spaced downstream from the inlet end plate to define an unobstructed inlet or throat region through which food product may be introduced to the blancher through a drum inlet opening. A perforated skin surrounds the drum and contains food product therein. An initial flight attachment plate extends from the auger into the throat region and has a curved leading edge which extends substantially below the water level within the tank to avoid contact with food product outside the water. As the auger is supported by the support channel members and the end plates, the throat region is clear of obstructions and food product may be introduced into the blancher without contacting rotating metal parts. Furthermore, the inlet opening may be larger in diameter than the central support tube if desired.

It is an object of the present invention to provide a blancher having a substantially unobstructed food product infeed path.

It is another object of the present invention to provide a blancher having a stiff and durable auger and drum assembly.

It is also an object of the present invention to provide a blancher with an inlet opening larger than the diameter of the auger core.

It is another object of the present invention to provide a blancher which preserves the integrity and uniformity of the food product treated therein.

Further objects, features and advantages of the invention will be apparent from the following detailed description when taken in conjunction with the accompanying drawings.

DESCRIPTION OF THE PREFERRED EMBODIMENT

Figure 1:
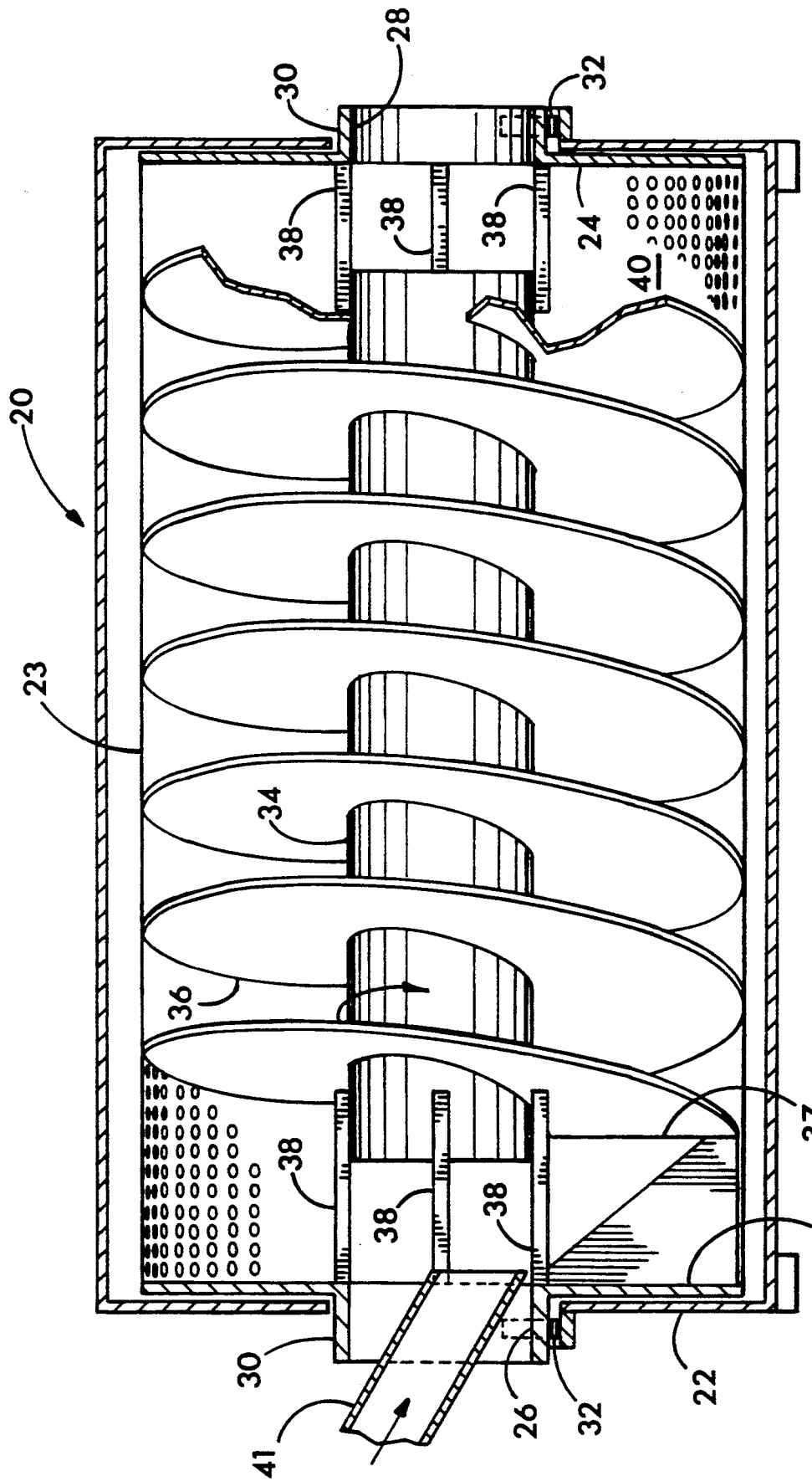
FIG. 1 is a cross-sectional view of a prior art blancher.

Referring more particularly to FIGS. 1-5, wherein like numbers refer to similar parts, a prior art blancher 20 is shown in FIG. 1. The prior art blancher 20 has an enclosed tank 22 within which is rotatably mounted a perforated cylinder 23. The cylinder 23 has two end plates 24 with circular infeed and discharge openings 26, 28. The infeed and discharge openings 26, 28 have cylindrical journals 30 which are supported on tank mounted trunnions 32 to allow rotation of the cylinder 23. A stiff cylindrical tube 34 extends axially through the perforated cylinder 23. A helical auger 36 is welded to the tube 34 and is supported thereon. The tube 34 is connected to the journals 30 at the infeed and discharge openings 26, 28 of the end plates 24 by a plurality of tube support members 38. These support members 38, which are typically L-shaped extrusions, are welded between the end plates 24 and the tube 34 to form a rigid structure which supports the auger 36. The support members 38 at the infeed end of the cylinder 22 allow food product to be introduced through an infeed chute 41 into the cylinder 23. A polygonal initial fight attachment 37 is connected to the auger radially outwardly from the support members. This attachment 37 brings about the initial engagement of food product with the helical auger 36. The food product is retained within the cylinder by the perforated screens 40 which extend between the end plates 24 and which rest against the auger 36 and which define the exterior of the cylinder 23.

Although the prior art blancher 20 utilizes a rigid and durable structure, the presence of the support members 38 at the inlet to the cylinder 23 present certain difficulties for particularly sensitive food product. In operation, the cylinder 23 and the support members 38 will be constantly rotating as food product is introduced through the infeed chute 41. As food product enters the cylinder 23, a certain amount will come into contact with the rotating members 38 and be cut, bruised, or otherwise damaged by the impact prior to being received within the cushioning water contained within the tank 22. Furthermore, the initial flight 37 of the auger 36 will occasionally impact against the food product causing additional damage.

Furthermore, the prior art blancher structure limits the infeed opening 26 to a diameter approximately equal to or less than that of the central tube 34.

Figure 2:
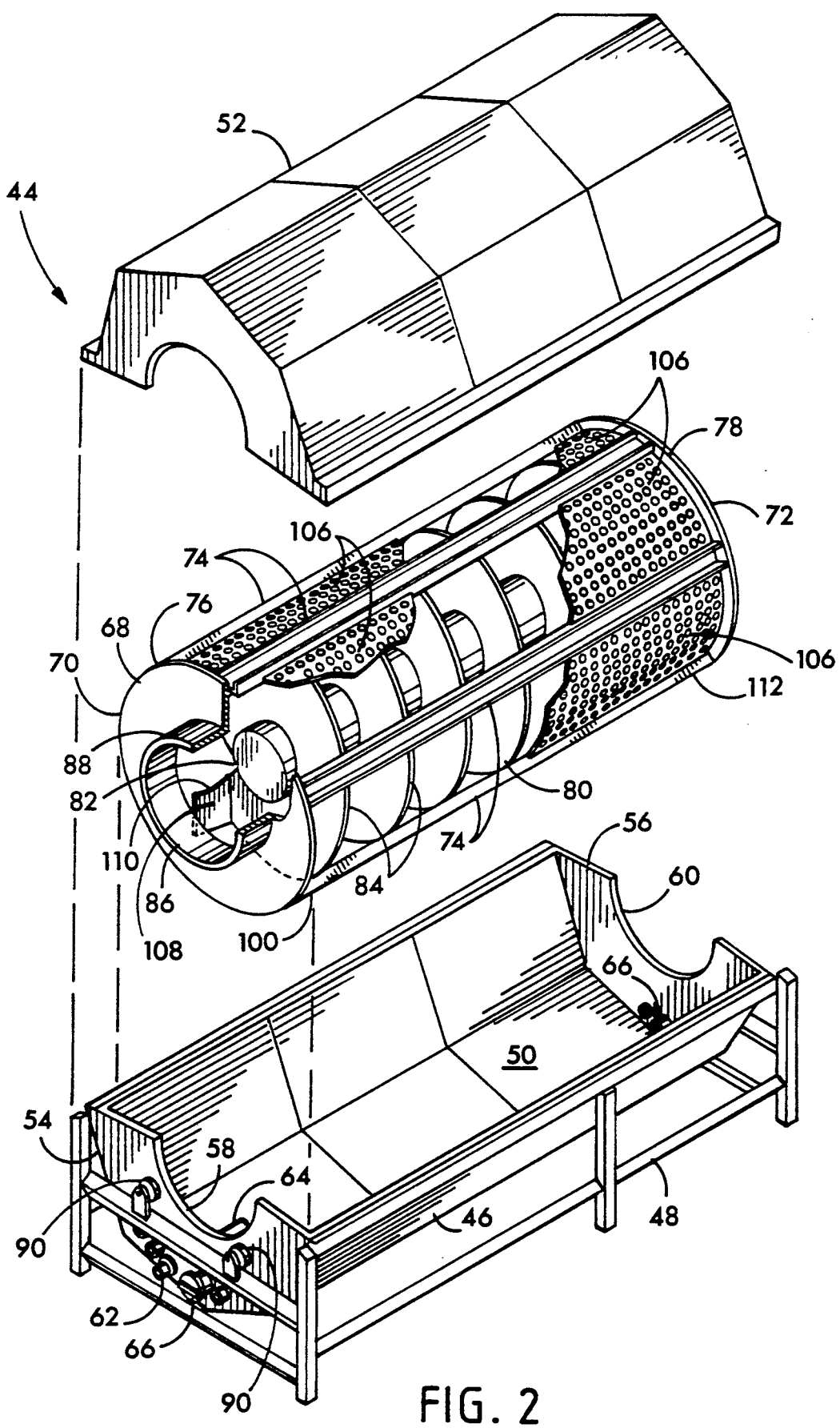
FIG. 2 is an exploded isometric view of the blancher of the present invention.

The blancher 44 of the present invention, shown in FIGS. 2-5, provides a rigid and durable structure which is substantially free of obstructions within the inlet end or "throat" region 100 of the drum. The open-throat blancher 44, as shown in FIG. 2, has an elongated open top tank 46 which is supported by a frame 48. The tank 46 has a four segment wall 50 with a plurality of drains (not shown) located at its lowest portion. An elongated vaulted cover 52 fits over and covers the tank 46. The tank 46 and cover 52 have an inlet end 54 and a discharge end 56. Portions of the tank and cover define an inlet opening 58 at the inlet end 54 and a discharge opening 60 at the discharge end 56.

The inlet end 54 of the tank 46 has a fixture 62 for the admission of steam into a steam manifold 64 located on the tank wall 50 within the tank 46. The admitted steam serves to raise the water temperature within the blancher 44 to an appropriate blanching level. Cleanout ports 66 are also located in each end 54, 56 of the tank 50, 46. Fixtures are also provided in the inlet end 54 and the tank 46 for introduction of a thermometer and thermocouple (not shown) for monitoring the temperature of the fluid contained within the tank 46. The cover 52 is hinged to the tank 46 in a known manner and may be hingedly attached to the tank such that it may be opened from either side of the blancher 44 as in the manner disclosed in U.S. Pat. No. 4,788,476 to Zittel, the disclosure of which is hereby incorporated by reference.

Figure 3:
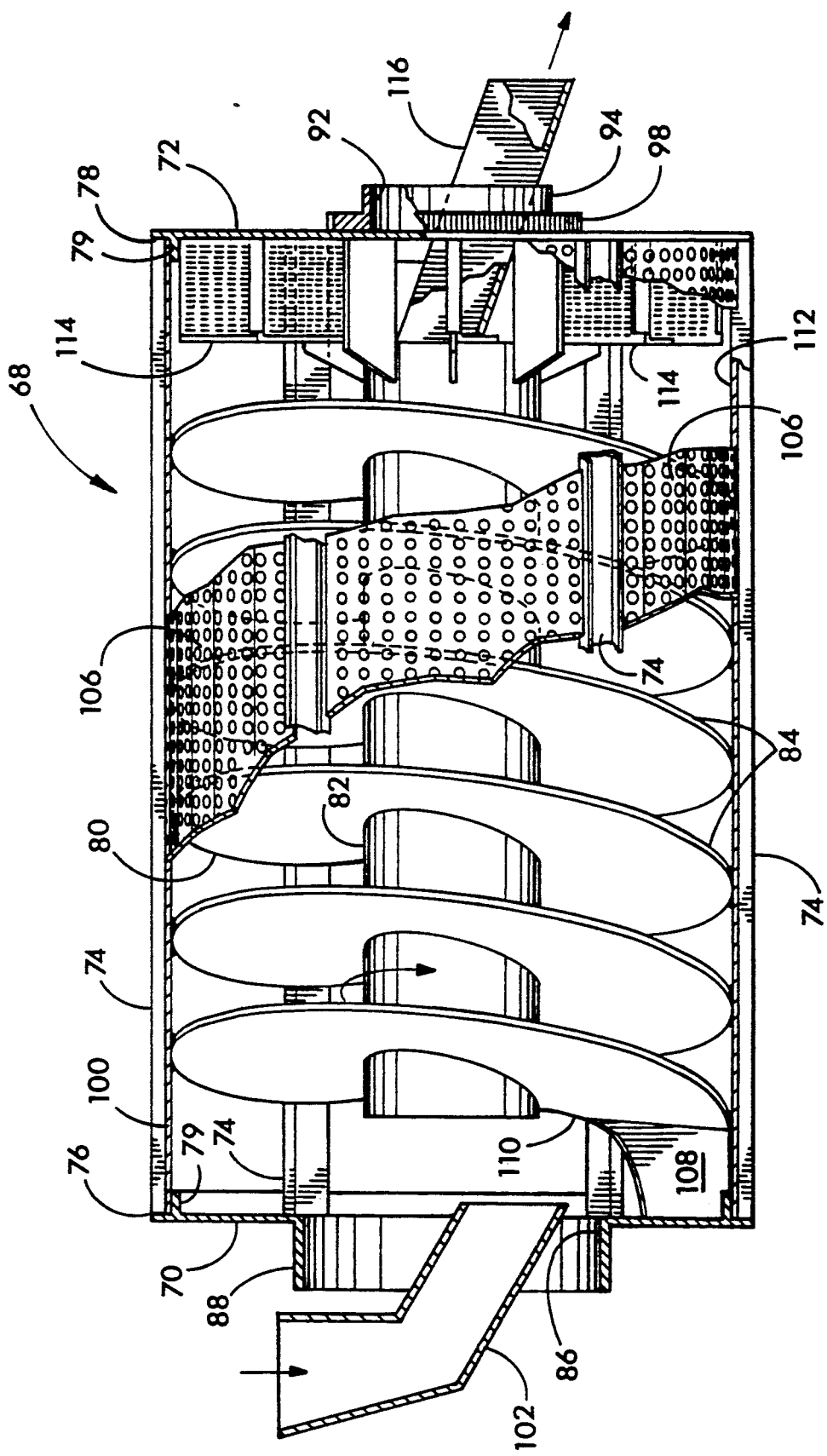
FIG. 3 is a side elevational view, partly broken away, of the blancher drum of FIG. 1.
Figure 4:
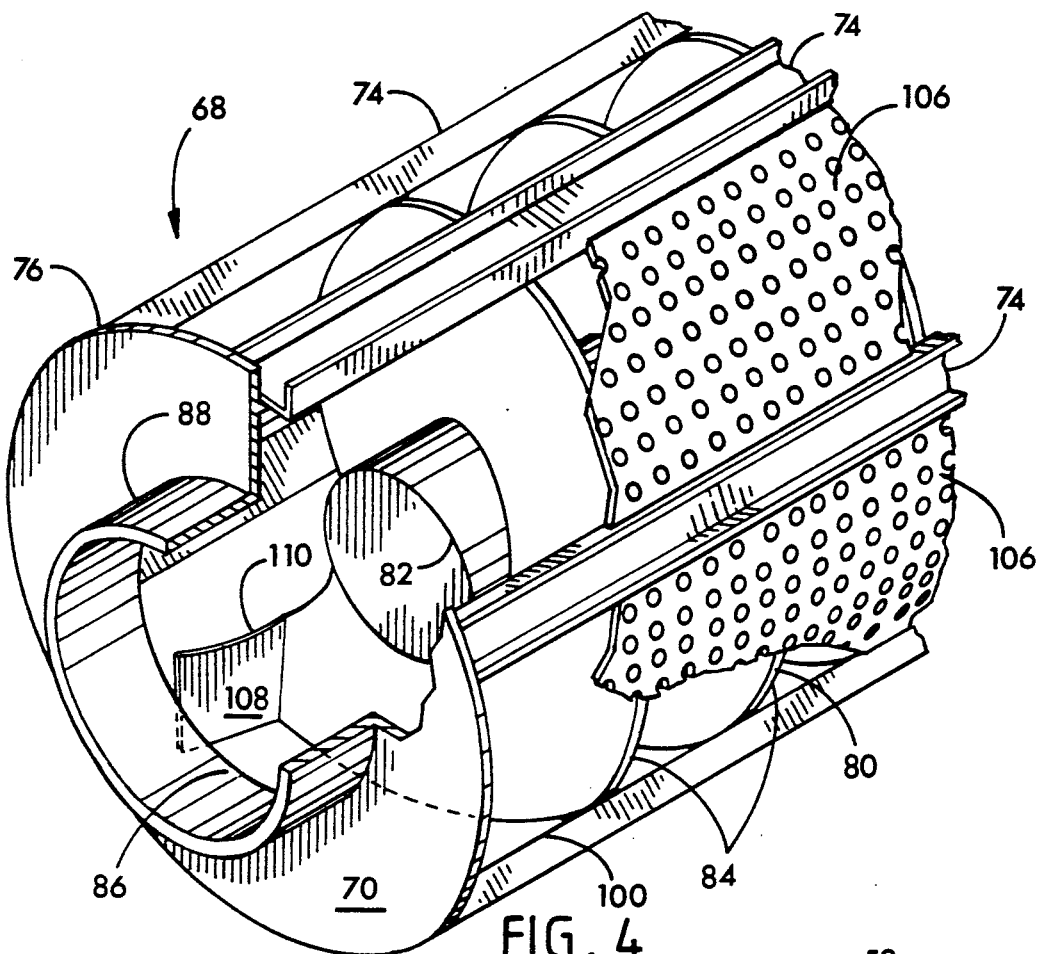
FIG. 4 is a fragmentary isometric view, partially broken away, of the drum of FIG. 3.

A cylindrical drum 68 is rotatably mounted within the tank 46. The rigid support structure of the drum 68 is formed by two spun stainless steel end plates 70, 72 which are connected by six C-channel support members 74 which extend axially between the inlet end plate 70 and the discharge end plate 72. The support members 74 are connected to the peripheral edges 76, 78 of the end plates 70, 72. Hence the support members 74 do not obstruct the flow of food product into the drum 68. The support members 74 may be welded directly to the flat end plates 70, 72, but in a preferred embodiment, as shown in FIGS. 3 and 4, the end plates are provided with inwardly extending annular lips 79 to which the support members are connected. These lips 79 provide added strength and rigidity to the drum structure.

The drum 68 is enclosed by a cylinder composed of a plurality of perforated plates 106 attached between the support members 74 to surround the helical auger 80. It should be noted that the perforated plates 106 in FIGS. 2-4, have been depicted with the relative dimensions of the perforations exaggerated for clarity. In general, perforations will be selected of a size sufficient to retain the food product 105 within the drum 68.

Stainless steel plates are welded to a cylindrical alignment tube 82 mounted coaxially within the drum 68 to form a helical auger 80 with a plurality of auger flights 84. The auger flights 84 extend between the alignment tube 82 and the support members 74 located at the periphery of the drum 68. The auger flights 84 are welded to the support members 74 where they engage against the support members 74. The auger 80 is thus substantially supported by the support members 74 and hence the end plates 70, 72.

The inlet end plate 70 has portions defining a circular inlet opening 86 which is concentric with the alignment tube 82. A cylindrical journal 88 extends outwardly from the inlet end plate 70. The journal 88 is supported on two rotatable trunnions 90 which are mounted to the frame 48 outside the tank 46 inlet opening 58. The diameter of the inlet opening 86 in the inlet end plate 70 may be selected to suit the particular needs of the blanching application. For example, where a wide food product is to be introduced into the drum 68, the inlet opening 86 may be much larger than the alignment tube 82 diameter. Of course, the inlet opening 86 diameter will be limited by the depth of water contained within the tank 46.

Portions of the discharge end plate 72 define a discharge opening 92 for the exit of food product from the blancher 44. A cylindrical journal 94 extends from the discharge end plate 72 around the discharge opening 92 and is supported on trunnions (not shown) mounted to the frame 48.

A drive sprocket 98, shown in FIG. 3, is mounted to one of the drum journals inwardly of the supporting trunnions and is driven by an electric motor (not shown) to rotate the drum at a desired speed. The drive sprocket 98 may be located at either end of the drum 68, but in blancher configurations having an inlet opening 86 substantially larger than the discharge opening 92, as in the blancher 44, shown in FIG. 3, for convenient mounting of the drive motor beneath the journal, the sprocket 98 is preferably located at the discharge end plate 72.

The axially extending segment of the drum 68 between the inlet end plate 70 and the alignment tube 82 is the throat region 100. It is in this region that food product is expelled from an infeed chute 102 into the interior of the drum 68. It is in the throat region 100 that raw food product first makes contact with the blancher 44. In the preparation of food product for human consumption, it is of great importance to preserve the integrity and uniformity of each individual food product. Nicks, cuts, bruises and other damage to food product are highly undesirable. Pasta, green peas, kidney beans, red beans, cut corn and string beans are examples of food product which are particularly sensitive to damage from contact with moving equipment parts. The open-throat region 100 of the blancher 44 ensures that the incoming food product makes initial contact with the water 104 contained within the tank 46 and not with any moving part of the drum 68.

An infeed flight attachment 108 extends between the inlet end plate 70 and the first flight 84 of the helical auger 80. The attachment 108 serves to initially engage the infeed food product 105 with the auger 80. The infeed flight attachment 108 is a plate which extends from a perforated exterior plate 106 to the beginning of the auger 80 at the alignment tube 82. The infeed flight attachment 108 has portions defining a curved inner edge 110. The inner edge 110 of the infeed flight attachment 108 is spaced a distance from the axis of the drum throughout the throat region 100 such that as the flight attachment 108 rotates with the drum around the flow of incoming food product, the inner edge 110 is clear of the flow. When the infeed flight attachment 108 passes through the water contained within the tank 46, the inner edge 110 is submerged so as only to make contact with the submerged food product once it is cushioned by the surrounding water.

Figure 5:
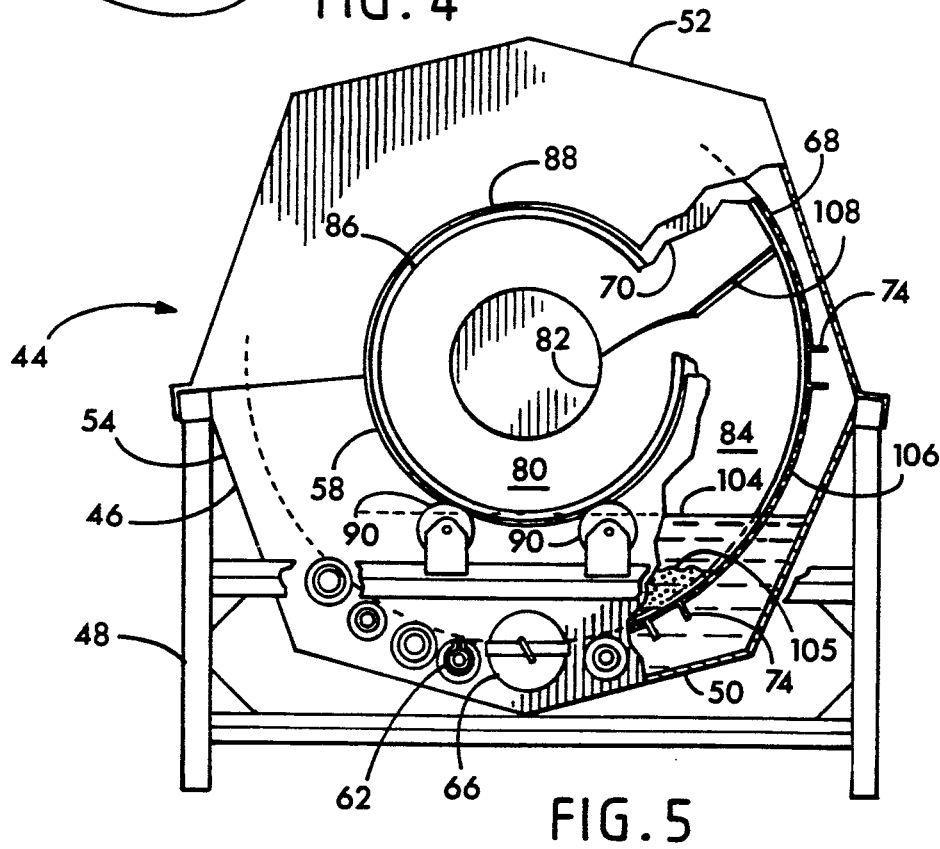
FIG. 5 is a front elevational view of the blancher of FIG. 1 showing the inlet end.

As best shown in FIG. 5, the drum 68 is partially submerged in the water 104 contained within the tank 46. The food product 105 will, through most of its trip through the blancher 44 be totally submerged within the water 104.

The infeed flight attachment 108 introduces the food product 105 to the helical auger 80 which gently advances the food product through the drum 68.

The food product is advanced through the drum 68 by the auger 80 until the food product reaches the discharge end region 112 of the drum, shown in FIG. 3. The auger 80 and alignment tube 82 terminate at a point spaced from the discharge end plate 72. Eight conventional lifting buckets 114 extend between the tube 82 and the discharge end plate 72. Each lifting bucket 114 is adapted to extend radially into the water 104, to engage food product 105 located within the water and to lift that food product out of the water. The lifting buckets 114 are formed of perforated sheets of stainless steel which allow most of the water to escape while the food product is lifted and deposited into a discharge chute 116. The discharge chute 116 extends through the discharge opening 92. It should be noted that the discharge end region 112 is not open as is the throat region. Such an openness is not required at the discharge end region 112 as food product is not flowing over the obstructions provided by the buckets 114 in that region.

It should be noted that the blancher of this invention may be formed from other corrosion resistant materials in addition to stainless steel and that the number and angle of the auger flights may be varied as desired.

It is understood that the invention is not limited to the particular embodiments disclosed and illustrated herein, but embraces such modified forms thereof as come within the scope of the following claims.

I claim:

1. A blancher comprising:
   a) a tank having an inlet end and a discharge end;
   b) an inlet end plate positioned within the tank adjacent the inlet end, the inlet end plate having portions defining an inlet opening;
   c) a discharge end plate positioned within the tank adjacent the tank discharge end, the discharge end plate having portions defining a discharge opening;
   d) a plurality of linear support members extending between and connecting the inlet end plate and discharge end plate, wherein the end plates and support members define a drum rotatably mounted within the tank;
   e) an auger having a plurality of helical continuous flights, the flights having outer peripheral edges which are connected to the support members;
   f) a perforated cylinder enclosing the auger and extending from the inlet end plate to the discharge end plate;
   g) a central cylindrical core tube mounted coaxially within the cylinder and connected to the auger, the core and auger terminating at a position spaced axially from the inlet opening, such that an unobstructed infeed path is defined between the central core tube, the auger and the inlet opening, to facilitate unhindered entry of food product into the drum.

2. The blancher of claim 1 wherein the auger has an initial flight which is continuous with the helical flights and which extends between the inlet end plate and the cylindrical core, and wherein the initial flight has portions defining an inner edge, the inner edge being spaced radially outwardly from the axis of the tank such that when the initial flight is submerged within water contained within the tank, the inner edge is below the water level.

3. The blancher of claim 1 wherein the diameter of the inlet opening is greater than the diameter of the cylindrical core.

4. The blancher of claim 1 wherein the diameter of the inlet opening is greater than the diameter of the discharge opening.

5. The blancher of claim 1 wherein the support members are C-channel beams.

6. The blancher of claim 1 wherein the perforated cylinder enclosing the auger comprises a plurality of perforated plates, and wherein the plates extend between the adjacent pairs of support members.

7. The blancher of claim 1, further comprising portions of the end plates which define protruding annular lips, wherein the linear support members engage against the protruding lips and are connected thereto.

8. A blancher comprising:
   a) a tank adapted to contain water at a desired level;
   b) a perforated cylindrical drum rotatably mounted within the tank, such that portions of the drum extend beneath the water level, the drum having a structural frame comprised of an inlet end plate connected to a discharge end plate by a plurality of linearly extending stiff support members, wherein the inlet end plate has portions defining an inlet opening for the introduction of food product and the discharge end plate having portions defining a discharge opening for the discharge of food product;
   c) a substantially helical auger mounted within the drum and connected to the support members of the structural frame;
   d) an initial flight attachment extending axially from the auger within the drum toward the inlet end plate, the initial flight having an inner edge which is spaced radially outwardly from the axis of rotation of the drum a distance such that when the initial flight is vertical within the tank, the inner edge is submerged beneath the water level and such that substantially all food product introduced into the drum through the inlet opening will avoid contact with the unsubmerged inner edge of the initial flight attachment.

9. The blancher of claim 7 wherein the inlet opening is of greater diameter than the discharge opening.

* * * * *